Sept. 24, 1968   W. KREUTER ET AL   3,402,762
METHOD OF AND APPARATUS FOR COOLING CHOCOLATE-COVERED
ARTICLES OR THE LIKE
Filed Dec. 22, 1965   2 Sheets-Sheet 1

Inventors
Walter Kreuter
Theobald Thamerus by Michael J. Striker

# United States Patent Office 3,402,762
Patented Sept. 24, 1968

3,402,762
METHOD OF AND APPARATUS FOR COOLING CHOCOLATE-COVERED ARTICLES OR THE LIKE
Walter Kreuter, Hamburg-Langenhorn, and Theobald Thamerus, Bemerode, near Hann, Germany, assignors to Kreuter & Co. K.G., Hamburg-Langenhorn, Germany
Filed Dec. 22, 1965, Ser. No. 515,641
2 Claims. (Cl. 165—39)

ABSTRACT OF THE DISCLOSURE

An apparatus for cooling chocolate covered articles or the like in which the articles are fed on a band conveyor adjacent the bottom wall of an elongated cooling duct in one direction therethrough, and in which two independently controllable cooling systems are provided which are respectively in heat exchange with the top and the bottom wall of the cooling duct and through each of which a cooling fluid is passed in counter-current to the movement of the articles passing through the duct.

---

The present invention relates to a method of cooling chocolate covered articles which are exposed to the effect of cool air in a cooling duct and to an apparatus for performing the method.

Known methods have the disadvantage that the conventional relatively long cooling period for chocolate coatings cannot be shortened while simultaneously providing acceptable treatment of the coated articles. A particular disadvantage of the known methods is that condensation causes the air passing through or circulating in the cooling duct to become increasingly charged with moisture so that the sensitive goods are diadvantageously affected thereby.

The invention is based on the recognition of physical facts which are connected with the change of a solidifying mass of chocolate. The invention is particularly concerned with these facts and provides means according to which a differentiation is made between latent heat and sensible heat of chocolate coated articles to be cooled.

It has been found that the articles to be cooled, for example, filled confectionary leaving a chocolate coating machine, loose only a portion of the heat by radiation. This is true in particular for the latent heat of change of state, i.e., the heat released during the solidification process or setting of the chocolate coatings.

The latent heat radiation consists of ultra long wave radiation which emanates directly from the articles to be cooled and during cooling, that is solidification of the chocolate coatings, this ultra long wave radiation removes a certain portion of the heat, the magnitude of which, however is unknown and cannot be measured.

In order to properly cool the chocolate covered articles it is therefore necessary not only to remove the latent heat but also the sensible heat, which has not been accomplished with known devices of this type. Thus, the conclusion is reached that in a radiation and cooling duct a different heat transmission must be effected than was obtained heretofore, a further condition being that the articles to be cooled in the radiation duct are treated more uniformly than articles cooled in a conventional duct. This may be more easily understood inasmuch as in the case of the latter kind of cooling, cold air is blown into a duct which is by no means smooth and which is open at the front and whereby, changing flow directions and such turbulences are created in the air flow that the articles to be cooled thereby are affected differently and irregularly.

It is an object of the present invention to provide for a method and apparatus of cooling chocolate covered articles or the like in which the above mentioned disadvantages of methods and apparatus known in the art for this purpose are avoided.

It is an additional object of the present invention to provide for a method and apparatus for cooling chocolate covered articles or the like, by means of which a perfect cooling is obtained and by means of which contact of the chocolate covered articles with condensed moisture during the cooling period is substantially avoided.

With these objects in view, the method of cooling chocolate covered articles or the like according to the present invention mainly comprises the steps of conveying the articles through an elongated cooling duct, and simultaneously circulating a cooling fluid in at least one or preferably two closed cooling systems along the cooling duct. With two systems the balance between bottom conduction cooling and cooling from the other surfaces is possible whereby the latent heat, that is the heat radiation is removed or absorbed by one system, whereas the sensible heat is removed or absorbed by conduction cooling by the other system. One advantage of this manner of operation is that condensation cannot form on the walls of the cooling conduit.

A preferred method according to the present invention provides further that the cooling fluid or cooling air of one or both cooling systems circulates in counter-current relative to the feed direction of the articles to be cooled.

Additionally the method of the present invention may also include the step of controlling the temperature of the cooling fluid in each system independently of the temperature of the cooling fluid in the other system. According to a further development of the present invention the articles to be cooled are conveyed through the duct closely adjacent to the bottom wall thereof and this bottom wall is cooled by one of the two cooling systems, whereas the other cooling system serves to cool the other walls of the cooling duct.

The apparatus according to the present invention mainly comprises an elongated cooling duct, conveying means extending through the interior of the cooling duct for conveying articles to be cooled in one direction therethrough, at least one closed circuit cooling system outside of the duct and arranged closely adjacent thereto so as to be heat-exchanging contact therewith, and means to circulate a cooling fluid, preferably cooling air through the cooling system.

The conveying means preferably include an elongated flexible means, for instance a flexible conveyor band guided on the bottom wall of the cooling duct, and the apparatus preferably includes an additional closed circuit cooling system and one of the cooling systems is in heat exchanging contact with the bottom wall of the cooling duct and the other with the top and/or side walls thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1:
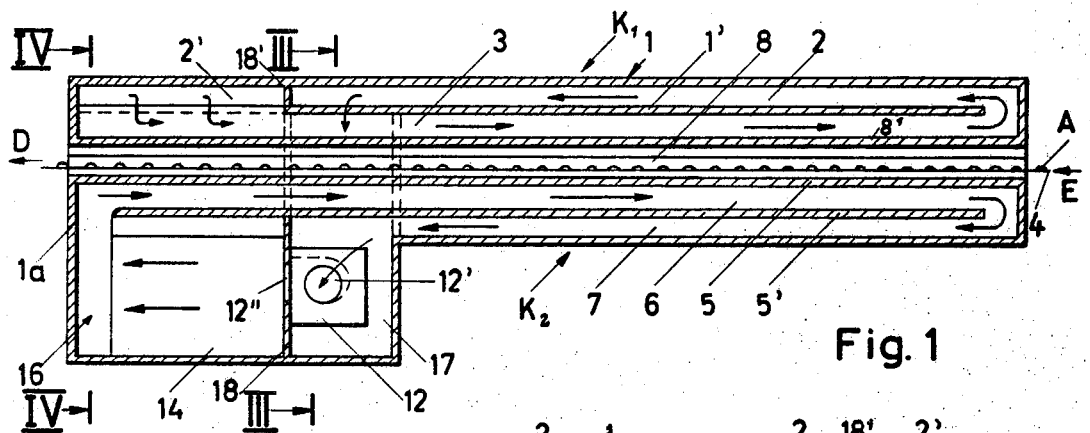
FIG. 1 is a longitudinal cross-section through the apparatus according to the present invention taken along the line I—I of FIG. 3.
Figure 2:
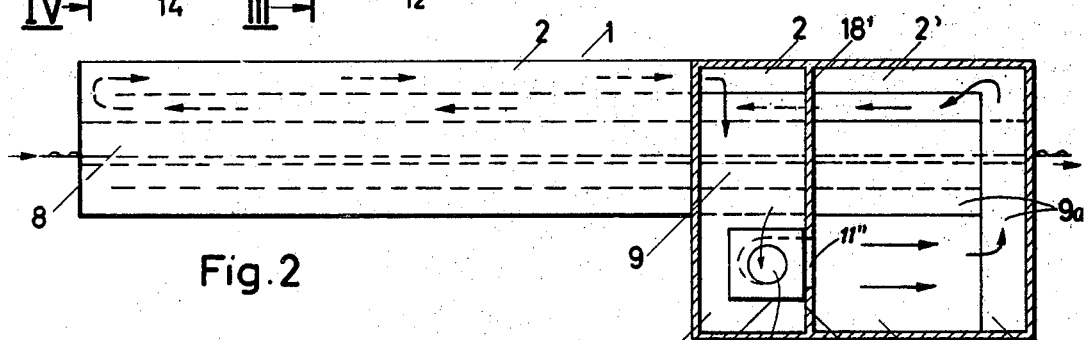
FIG. 2 is a cross-section similar to FIG. 1, taken along the line II—II of FIG. 3.

Referring now to the drawings, and more specifically to FIGS. 1–4 of the same, it will be seen that the apparatus of the present invention comprises an elongated housing 1, through which an elongated cooling duct 8 extends in longitudinal direction. The cooling duct 8 has a top wall 8', a bottom wall 5 and side walls 8'' extending between the top wall 8' and the bottom wall 5 of the cooling duct 8. Conveying means 4, preferably in the form of an endless transporting band of plastic material having a portion extending through the duct 8 closely adjacent to the bottom wall 5 thereof, are provided for transporting the articles to be cooled, for instance filled confectionery leaving a chocolate coating machine, spaced from each other through the cooling duct 8 of the apparatus from an inlet end E to an outlet end D of the cooling duct. The remaining portion of the conveying band 4, not shown in the drawings, is guided in an endless loop over guide rolls, likewise not shown in the drawing, and one of which is rotated in any convenient manner so as to move the conveyor belt 4 in the direction as indicated in FIGS. 1 and 2. The apparatus includes further two independent closed circuit cooling systems K1 and K2 through which cooling fluid, preferably cooling air is circulated in a manner as will be described later on in detail. The cooling system K1 has a lower duct 3 through which the cooling air is passed, as indicated by the arrows in countercurrent to the direction of movement of the articles to be cooled through the cooling duct 8. The bottom wall of the lower duct 3 of the cooling system K1 is formed at least in part by the top wall 8' of the cooling duct, whereas the top wall thereof is formed by wall 1' extending longitudinally substantially parallel to the wall 8'. The cooling system K1 has a return duct 2 communicating at one end thereof, shown in FIG. 1 as the right end, with the duct 3 and the bottom wall of the return duct 2 of the cooling system K1 is formed by the top wall 1' of the lower duct of the cooling system K1 whereas the top wall of the return duct 2 is formed by the top wall of the housing 1. The closed circuit cooling system K2, which extends along the bottom wall 5 of the cooling duct 8, includes an upper duct 6 through which air is passed in the same direction as through the duct 3 of the cooling system K1, that is in countercurrent to the direction at which the particles A are transported on the transporting belt 4 through the cooling duct 8. The top wall of the upper duct 6 of the cooling system K2 is formed by the bottom wall 5 of the cooling duct, whereas the bottom wall thereof is formed by a longitudinal wall 5' extending parallel to the wall 5. The cooling system K2 includes also a return duct 7 which communicates at one end thereof, shown in FIG. 1 as the right end, with the upper duct 6 and the top wall of the return duct of the cooling system K2 is formed by the bottom wall 5' of the upper duct of the cooling system K2 whereas the bottom wall of the return duct 7 is formed by the bottom wall portion of the housing 1.

The apparatus includes further means to circulate cooling air through the closed cooling systems K1 and K2. The means for circulating cooling air through the two cooling systems are housed in an enlarged portion 1a of the housing 1 which is located at the left side, as viewed in FIG. 1, of the housing. The housing portion 1a is divided by a transverse wall 18 and by a longitudinally extending wall 15 into four chambers, that is into the chambers 16 and 17 located to one side of the longitudinally extending wall 15, and the chambers 16a and 17a on the other side of the longitudinal wall 15, whereas the transverse wall 18 separates the chambers 16 and 17, respectively, the chambers 16a and 17a from each other.

Figure 3:
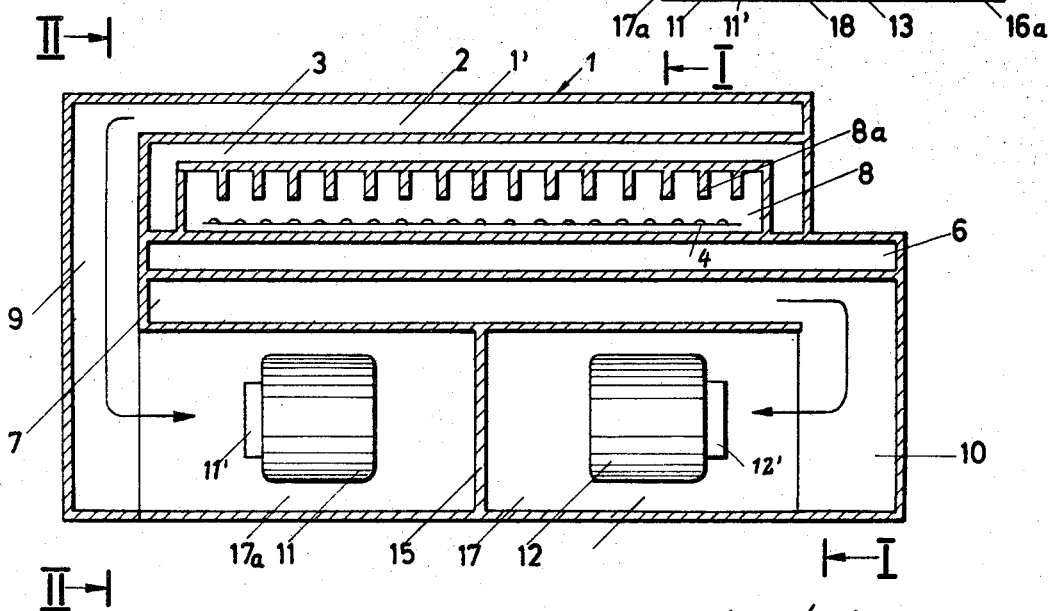
FIG. 3 is a transverse cross section through the apparatus taken along the line III—III of FIG. 1.
Figure 4:
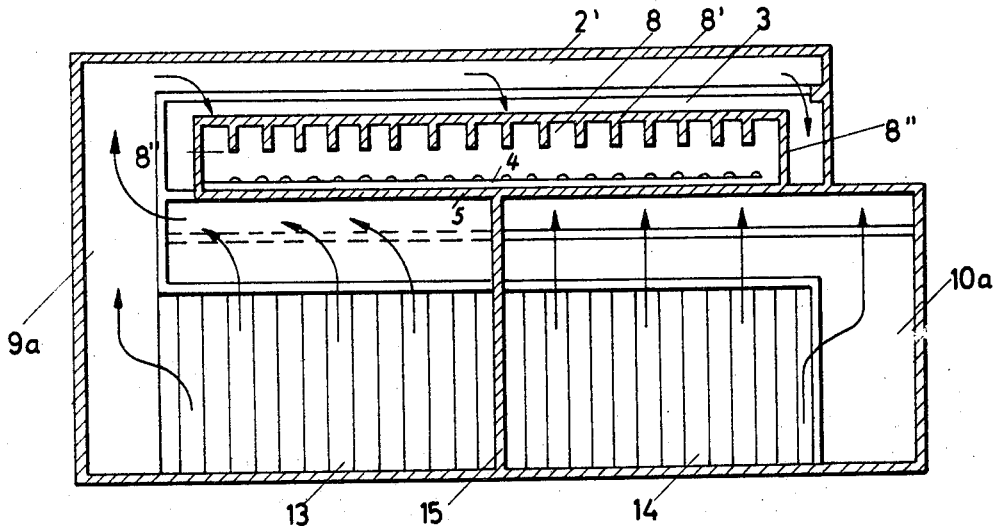
FIG. 4 is a transverse cross-section taken along the line IV—IV of FIG. 1.

The means for circulating cooling air through the ducts of each cooling system K1 and K2 include heat exchange means and blower means for blowing air over the respective heat exchange means. The blower means 11 for the cooling system K1 are located in the chamber 17a, whereas the blower means 12, for the cooling system K2 are located in the chamber 17. Each of the blower means 11 and 12 may be in the form of a rotary pump of any known construction driven for instance by an electromotor. The return channel 2 of the cooling system K1 communicates, as best shown in FIGS. 2 and 3, through a passage 9 with the chamber 17a so that cooling air will be sucked from the return duct 2 through passage 9 into the inlet end 11' of the blower means 11 to be discharged therefrom through an opening 11'' formed in the transverse wall 18 through the heat exchanger means 13 located in the chamber 16a aligned in longitudinal direction with the chamber 17a. The air thus passed over the heat exchanger means 13 flows through a passage 9a formed between parts of the walls of the enlarged housing portion 1a, and the front and one side face of the heat exchanger means 13, into a continuation 2' of the return channel 2 separated from the latter by the upper portion 18' of the transverse wall 18 and to flow from there as indicated by the arrows in FIGS. 1 and 4 into the left end, as viewed in FIG. 1, of the lower duct 3 of the cooling system K1.

The blower means 12 of the cooling system K2 are located in the chamber 17 which communicates with the return duct 7 of the system K2 through a passage 10, as best shown in FIG. 3, so that air from the return duct 7 will be sucked through the inlet end 12' of the blower means 12 and be discharged therefrom through the opening 12'' in the transverse wall 18 to pass over the heat exchanger means 14 in the chamber 16. The cooled air produced by passage of air through the heat exchanger means 14 flows through a passage 10a, best shown in FIGS. 1 and 4, into the left end, as viewed in FIG. 1, of the upper duct 6 of the cooling system K2, which in turn communicates at the right end thereof, as viewed in FIG. 1, with the right end of the return duct 7.

Figure 5:
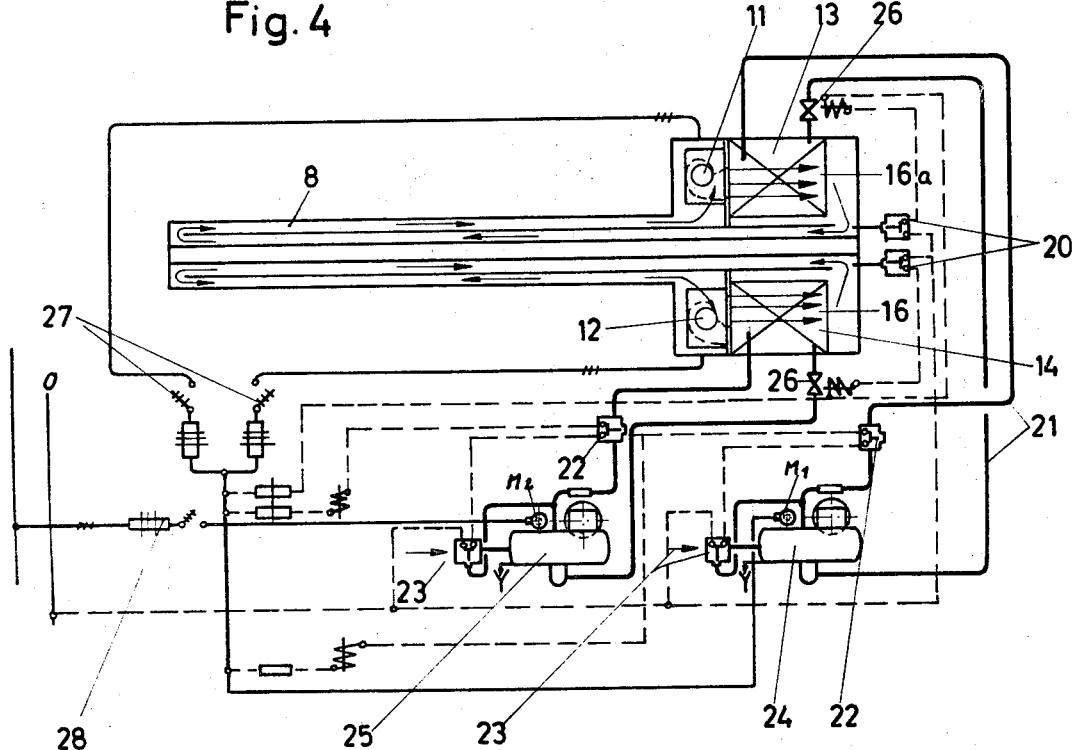
FIG. 5 is a schematic view of the apparatus according to the present invention and including a schematic wiring and conduit diagram.

The heat exchanger means 13 and 14 are of well known construction and they include a plurality of conduits over which the air circulated by the blower means 11 and 12 through the cooling systems K1 and K2 passes and to which a compressed gas is furnished from compressors 24 and 25, respectively, by conduits 21 as schematically shown in FIG. 5. The compressed gas is expanded in the heat exchangers 13 and 14, respectively, so as to cool in known manner the air blown therethrough by means of the blowers 11 and 12.

The apparatus includes further a pair of temperature control means for independently controlling the temperature of the cooling air passing through the cooling systems K1 and K2, respectively. The temperature control means includes a pair of thermostats 20 as schematically shown in FIG. 5 which respectively have a sensing portion located in the chambers 16 and 16a and the contacts of each thermostat 20 are electrically connected in the manner as schematically illustrated in FIG. 5 to control solenoid operated valves 26 respectively located in the conduits leading from the compressors 24 and 25 to the inlets of the heat exchanger means 13 and 14, to control opening and closing of these valves in a known manner according to the temperature sensed by the thermostats 20. The diagram of FIG. 5 shows also pressure switches 22 and 23 in the conduits of the compressors 24 and 25 for controlling the drive motors M1 and M2 of the compressors as well as switches 27 and coordinated fuses for switching the motors of the blowers 11 and 12, not shown in the drawing, on and off, and a main switch 28 with its fuses for connecting and disconnecting the whole machine to the network. The electrical diagram shown in FIG. 5 is a schematic one line diagram.

The operation of the machine above described will be obvious from the description thereof. At the start of the operation the switches 27 and 28 are closed so that the compressors 24 and 25 feed compressed gas into the heat exchanger means 13 and 14, respectively, in which the compressed gas expands to cool thereby the air blown by the blower means 11 and 12 through the heat exchanger means 13 and 14, respectively. The thus cooled air passes from the heat exchanger means 13 through the passage 9a into the lower duct 3 of the closed cooling system K1 and is returned through the return passage 2, the passage 9, into the inlet end 11' of the blower means 11 to be recirculated by the latter through the heat exchanger means 13. The cooled air from the heat exchanger means 14 passes through the passage 10a into the upper duct 6 of the cooling system K2 and flows in the opposite direction through the return duct 7, and the passage 10 into the inlet opening 12' of the blower means 12 to be recirculated by the same over the heat exchanger means 14. The cooled air in the ducts 3 and 6 cools the walls of the cooling duct 8 as well as the air in the cooling duct. Heat exchange between the top wall of the cooling duct and the air therein is increased by the fins 8a projecting inwardly from the top wall 8' of the cooling duct. After the air in the cooling duct has reached the desired temperature, movement of the belt 4 is started and chocolate covered articles coming from a chocolate coating machine are moved through the cooling duct 8 by the belt 4 to be cooled as they pass through the cooling duct. It will be noted that the cooled air passes through the ducts 3 and 6 located adjacent and at opposite sides of the cooling duct 8 in countercurrent to the direction of movement of the belt 4 and the articles thereon through the cooling duct 8 so that the articles as they pass through the cooling duct 8 will be subjected to gradually lowering temperatures. The temperatures in the cooling system K1 and K2 may be regulated independent from each other to obtain a desired cooling of the articles by heat convection through the belt and the bottom wall of the cooling duct and by heat radiation through the cooled air in the cooling duct 8. The temperature in the cooling systems K1 and K2 may be regulated between —5° C. and +25° C. and experience has shown that maintenance of the temperatures in the cooling systems K1 and K2 between +6° C. and +8° C. which impart to the walls of the cooling duct and the air therein a temperature of about +9° C. to 11° C. has given most advantageous results.

The length of the cooling duct 8 of an actually built cooling apparatus according to the present invention has been made 13 meters and the belt 4 is operated with a speed so as to transport the articles to be cooled in two to three minutes through the machine. This cooling time is only a fraction of the cooling time heretofore required in apparatus for cooling chocolate covered articles according to the prior art.

It will be understood that each of the elements described above, or two or more together, may also find a useful application in other types of method and apparatus for cooling chocolate covered articles or the like differing from the types described above.

While the invention has been illustrated and described as embodied in method and apparatus for cooling chocolate covered articles or the like, it is not intended to be limited to the details shown, since various modifications and structural changes may be made without departing in any way from the spirit of the present invention.

We claim:

1. An apparatus for cooling chocolate covered articles or the like, comprising, in combination, an elongated cooling duct having a bottom wall, a pair of side walls and a top wall; conveying means extending adjacent said bottom wall through said duct for conveying the articles in one direction therethrough; two independent cooling systems, one arranged to be in heat exchange with said top wall and the other to be in heat exchange with said bottom wall of said duct; means for passing a cooling fluid through each of said cooling systems respectively along the exterior of said top and said bottom wall, and in a direction opposite to said one direction; and temperature regulating means for regulating independently from each other the temperature of the cooling fluid passing through said cooling systems, said temperature regulating means comprising a pair of temperature sensing means for respectively sensing the temperatures of the cooling fluids respectively passing through said two cooling systems and means for respectively cooperating with said pair of temperature sensing means so as to maintain the temperatures of the cooling fluids in said two systems respectively at different predetermined temperatures.

2. An apparatus as set forth in claim 1, wherein said one cooling system is also arranged to be in heat exchange with said side walls of said cooling duct.

References Cited

UNITED STATES PATENTS

| | | | |
|---|---|---|---|
| 2,961,976 | 11/1960 | Ooms | 107—63 |
| 3,019,618 | 2/1962 | Meyer | 34—62 X |
| 2,422,105 | 6/1947 | Lehrer | 34—66 X |
| 2,757,518 | 8/1956 | Schofield | 165—107 X |
| 2,768,916 | 10/1956 | Seabold et al. | 266—3 X |
| 2,788,618 | 3/1957 | Mills | 165—120 X |
| 3,174,228 | 3/1965 | Smith | 34—41 X |

FOREIGN PATENTS 901,289  7/1962  Great Britain.

ROBERT A. O'LEARY, *Primary Examiner.*

A. W. DAVIS, JR., *Assistant Examiner.*